United States Patent
Hasei et al.

(10) Patent No.: US 7,492,521 B2
(45) Date of Patent: Feb. 17, 2009

(54) OPTICAL SHEET, BACKLIGHT UNIT, ELECTRO-OPTICAL DEVICE, ELECTRONIC APPARATUS AND METHOD FOR MANUFACTURING THE OPTICAL SHEET

(75) Inventors: Hironori Hasei, Okaya (JP); Akira Inagaki, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/422,205

(22) Filed: Jun. 5, 2006

(65) Prior Publication Data
US 2006/0279036 A1    Dec. 14, 2006

(30) Foreign Application Priority Data
Jun. 8, 2005    (JP) ............... 2005-167850

(51) Int. Cl.
*G02B 27/10* (2006.01)
(52) U.S. Cl. .................................... 359/619
(58) Field of Classification Search .............. 270/58.02; 359/245, 315, 619
See application file for complete search history.

(56) References Cited

U.S. PATENT DOCUMENTS

| | | | |
|---|---|---|---|
| 6,042,974 A * | 3/2000 | Iwata et al. ..................... 430/7 |
| 6,491,397 B2 | 12/2002 | Ogawa et al. | |
| 6,599,582 B2 * | 7/2003 | Kiguchi et al. ............... 427/466 |
| 2004/0196516 A1 * | 10/2004 | Petersen et al. ................ 359/15 |
| 2005/0270654 A1 * | 12/2005 | Goto et al. ................... 359/626 |
| 2006/0145374 A1 * | 7/2006 | Baba et al. .................. 264/1.34 |
| 2006/0285352 A1 * | 12/2006 | Kim ............................ 362/558 |
| 2006/0285360 A1 * | 12/2006 | Hasei ......................... 362/627 |
| 2007/0092733 A1 * | 4/2007 | Yang et al. ................... 428/413 |

FOREIGN PATENT DOCUMENTS

| | | |
|---|---|---|
| JP | 06-027454 | 2/1994 |
| JP | 11-002704 | 1/1999 |
| JP | 2004-361428 | 12/2004 |
| TW | 523609 | 3/2003 |

* cited by examiner

*Primary Examiner*—Jessica T Stultz
*Assistant Examiner*—Mahidere S Sahle
(74) *Attorney, Agent, or Firm*—Harness, Dickey & Pierce, P.L.C.

(57) ABSTRACT

A method for manufacturing an optical sheet, comprises: (a) discharging a first lens material in liquid form being a material for a micro lens on a sheet in a dot array; (b) semi-curing the first lens material arranged on the sheet; (c) discharging a second lens material in liquid form being a material for the micro lens towards gap portions between the dots of the first lens material; and (d) forming a micro lens array by full curing the first and the second lens materials.

6 Claims, 6 Drawing Sheets

OPTICAL SHEET, BACKLIGHT UNIT, ELECTRO-OPTICAL DEVICE, ELECTRONIC APPARATUS AND METHOD FOR MANUFACTURING THE OPTICAL SHEET

BACKGROUND OF THE INVENTION

1. Technical Field

The present invention relates to an optical sheet, a backlight unit, an electro-optical device, an electronic apparatus, and a method for manufacturing the optical sheet.

A backlight unit is used as a light source for a liquid crystal display device such as a notebook personal computer, a portable terminal and the like, and functionally, high luminance and uniform luminance are demanded.

2. Related Art

A conventional backlight unit is configured with a light source, a light guide plate which guides light from the light source to an entire surface of a plane, an optical sheet (diffuser) which diffuses light irradiated from the light guide plate, and the like. A known optical sheet is the one which a plurality of micro lenses are formed on the sheet.

JP-A-6-27454 is an example of related art.

However, as the above optical sheet has gap portions between the micro lenses, light rays which pass through the gap portions were apt to exist. Therefore, it was difficult to collect light and provide enough luminance.

SUMMARY

An advantage of the present invention is to solve the above problems and provide an optical sheet, a backlight unit, an electro-optical device, an electronic apparatus, and a method for manufacturing the optical sheet which has high luminance and is able to reduce luminance irregularity.

A method for manufacturing an optical sheet of the present invention according to one aspect of the invention includes: (a) discharging a first lens material in liquid form that is to become a material for micro lenses on a sheet in a dot array; (b) semi-curing the first lens material arranged on the sheet; (c) discharging a second lens material in liquid form that is to become the material for the micro lenses towards gap portions between dots of the first lens material; and (d) forming a micro lens array by full curing the first and the second lens materials.

In the above-mentioned method, it is preferable that the first lens material be discharged so that the first lens material is deposited on the sheet in the dot array [first discharging process (a)]. The deposited first lens material cures into the semi-cured state [semi-curing process (b)]. Next, the second lens material is discharged towards the gap portions between the dots of the first lens material [second discharging process (c)]. And the first and the second lens materials are fully cured so as to form the micro lens array [fully curing process (d)]. Therefore, as the second lens material is discharged while the first lens material is in semi-cured state, the first lens material and the second lens material do not bond easily. And because the second lens material spreads into the gap portions between the dots of the first lens in a state that the first lens material is maintaining its shape, the top of the sheet is covered with the micro lenses, which enables to obtain high luminance and reduce luminance irregularity.

A method for manufacturing the optical sheet according to another aspect of the invention includes applying a liquid-repellent treatment on the sheet before the first discharging process [liquid-repellent treatment process].

In the above-mentioned method, it is preferable that the discharged liquid droplets of the first lens material being deposited on the sheet are to have a large contact angle by the liquid-repellent treatment so that they are formed into the liquid droplets with large curvature. This facilitates an accumulation of the second lens material into the gap portions between the dots of the first lens material, which enables the micro lenses to cover the sheet easily without gaps.

A method for manufacturing the optical sheet according to another aspect of the invention includes forming the dot array by discharging the first lens material in a staggered arrangement in the first discharging process (a), and discharging the second lens material into the gap portions between the dots of the first lens material in the second discharging process (c).

In the above-mentioned method, it is preferable that the first lens material be arranged in the staggered arrangement so that a space between the dots becomes dense. Thus, the sheet is to be covered with the micro lenses easily without gaps, even the discharge of the second lens material may be relatively small in amount.

A method for manufacturing the optical sheet according to another aspect of the invention includes having diffusion fine particles in at least one of either the first lens material or the second lens material.

In the above-mentioned method, it is preferable that a micro lens material including the diffusion fine particles be formed so as to improve light diffusion.

An optical sheet according to another aspect of the invention includes being manufactured by the above method for manufacturing the optical sheet.

In this case, as the top of the sheet is mostly covered with the micro lenses without gaps, the optical sheet with high luminance and a reduced luminance irregularity can be provided.

An optical sheet according to another aspect of the invention includes: a sheet having an optical transparency; a first micro lens arranged on the sheet; a second micro lens formed between the first micro lenses; and a micro lens array formed by integrating the first and the second micro lenses.

In this case, as the second micro lens is molded between the first micro lenses formed on the sheet, and the micro lens array that the first and the second micro lenses being integrated covers the sheet, high luminance and the reduced luminance irregularity is thus provided.

An optical sheet of the invention according to another aspect of the invention includes the micro lens array having the first and the second micro lenses with different curvatures, respectively.

In this case, by combining the micro lenses with different curvatures, an approximate uniform focal length can be provided.

An optical sheet of the invention according to another aspect of the invention includes the micro lens array having the first and the second micro lenses with different sizes, respectively.

In this case, by combining the micro lenses with different sizes, the approximate uniform focal length can be provided.

An optical sheet of the invention according to another aspect of the invention includes the micro lens array having the first and the second micro lenses with different materials, respectively.

In this case, by combining the micro lenses with different materials and adjusting a refractive index of each material, the approximate uniform focal length can be provided.

A backlight unit according to another aspect of the invention includes: a light source and the optical sheet dispersing light irradiated from the light source; and the above optical sheet being provided.

In this case, as the micro lens array having integrated the first and the second micro lenses covers the top of the sheet, the backlight unit with high luminance and the reduced luminance irregularity can be provided.

An electro-optical device according to another aspect of the invention wherein the above backlight unit is provided.

In this case, the electro-optical device with high luminance and the reduced luminance irregularity can be provided.

An electronic apparatus according to another aspect of the invention wherein the above electro-optical device is mounted.

In this case, the electronic apparatus with high luminance and the reduced luminance irregularity can be provided.

BRIEF DESCRIPTION OF THE DRAWINGS

The invention will be described with reference to the accompanying drawings, wherein like numbers reference like elements.

FIG. 1A is a plan view and FIG. 1B is a cross-sectional view.

FIG. 5A is a partially broken perspective view, and FIG. 5B is a cross-sectional view of a main part.

DESCRIPTION OF EXEMPLARY EMBODIMENTS

Embodiments of the invention will now be described below with reference to the drawings.

[Structure of an Optical Sheet]

Figure 1A:
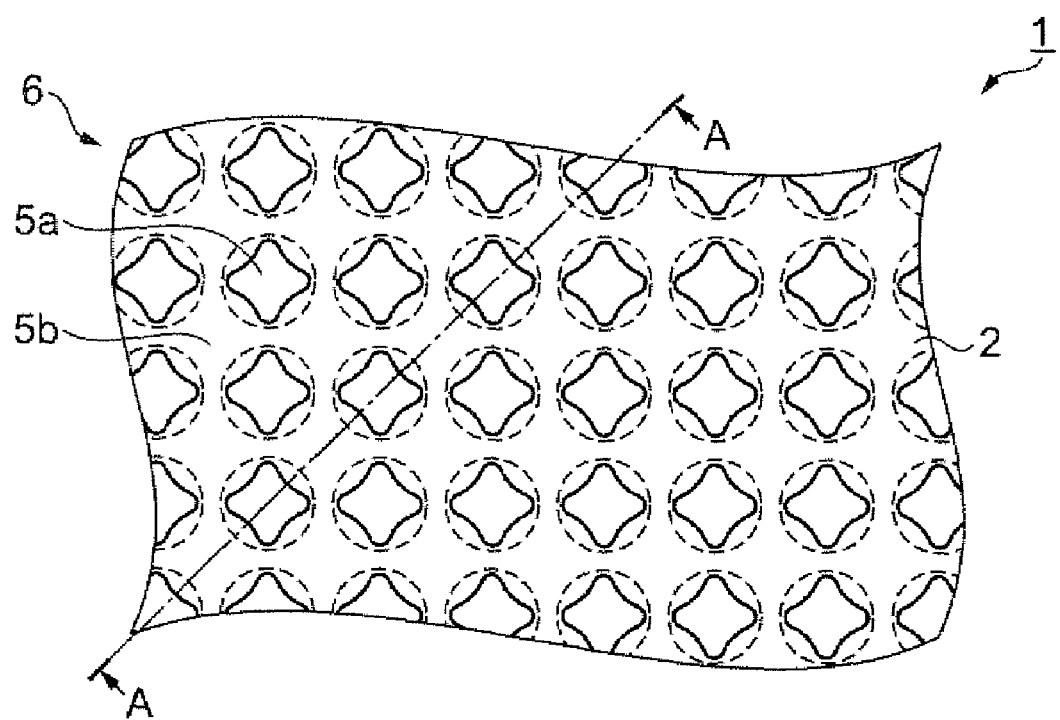
FIGS. 1A and 1B are schematically showing structures of an optical sheet according to a present embodiment.
Figure 1B:
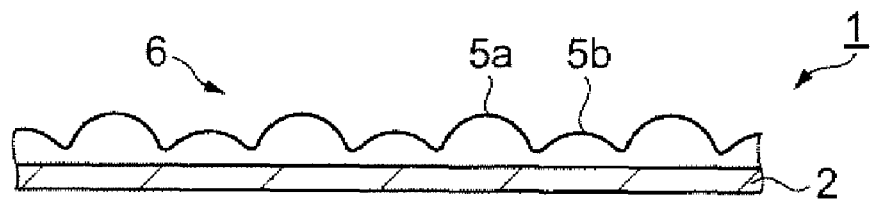

First of all, a structure of an optical sheet according to the present invention is to be described. FIGS. 1A and 1B are block diagrams schematically showing the optical sheet. FIG. 1A is showing a plan view, and FIG. 1B is showing a cross-sectional view taken along lines A-A of FIG. 1A.

In FIGS. 1A and 1B, an optical sheet 1 is configured with a sheet 2 having an optical transparency and a micro lens array 6 formed on the sheet 2.

The sheet 2 has the optical transparency and, for example, transparent resin materials such as acrylic resin, glass, quartz, polycarbonate, polyester, and the like are used.

The micro lens array 6 is formed by integrating a first micro lens 5a and a second micro lens 5b formed on the sheet 2.

The first and the second micro lenses 5a and 5b are approximately hemispherical in shape, and the second micro lens 5b is formed so as to cover a part and between the arrays of the first micro lens 5a.

As the first and the second micro lenses 5a and 5b, for example, a UV-curable acrylic resin and a UV-curable epoxy resin are used, and as a precursor, a polyimide precursor may be included.

The UV-curable resins include at least one of a prepolymer, an oligomer, or a monomer and a photopolymerization initiator.

As the prepolymer or the oligomer of the CV-curable acrylic resin, acrylates such as epoxy acrylates, urethane acrylates, polyester acrylates, polyether acrylates, spiroacetal acrylates and the like, and methacrylates such as epoxy methacrylates, urethane methacrylates, polyester methacrylates, polyether methacrylates and the like may be used.

As the monomer, for example, a monofunctional monomer such as 2-ethylhexyl acrylate, 2-ethylhexyl methacrylate, 2-hydroxyethyl acrylate, 2-hydroxyethyl methacrylate, N-vynyl-2-pyrrolidone, carbitol acrylate, tetrahydrofurfuryl acrylate, isobornyl acrylate, dicyclopentenyl acrylate, 1,3-butanediol acrylate and the like, a bifuctional monomer such as 1,6-hexanediol diacrylate, 1,6-hexanediol dimethacrylate, neopentyl glycol diacrylate, polyethylene glycol diacrylate, pentaerythritol diacrylate and the like, and a polyfunctional monomer such as trimethylolpropane triacrylate, trimethylolpropane trimethacrylate, pentaerythritol triacrylate, dipentaerithritol hexaacrylate and the like are included.

As the photopolymerization initiator, for example, radical-generating compounds such as acetophenones such as 2,2-dimethoxy-2-phenylacetophenone and the like, butylphenones such as alpha-hydroxyisobutylphenone, p-isopropyl-alphahydroxyisobutylphenone and the like, acetophenone halides such as p-tert-butyldichloroacetophenone, alpha, alpha-dichloro-4-phenoxyacetophenone and the like, benzophenones such as benzophenone, N,N-tetraethyl-4,4-di-aminobenzophenone and the like, benzyls such as benzyl, benzyl dimethyl ketal and the like, benzoins such as benzoin, benzoin alkyl ether and the like, oximes such as 1-phenyl-1, 2-propanedion-2-(o-ethoxycarbonyl)oxime and the like, xanthones such as 2-methylthioxanthone, 2-chlorothioxanthone and the like, benzoin ethers such as benzoin ether, isobutyl benzoin ether and the like, and Michler's ketones may be included. The resin after the UV-curable acrylic resin is being cured has an advantage of high transparency.

As the polyimide precursor, polyamic acid, polyamic acid long chain alkyl ester and the like may be included. A polyimide resin which is obtained by thermosetting the polyimide precursor has transmittance ratio of more than 80% in a visible light region with a high refractive index of 1.7 to 1.9, which enables to obtain a great lens effect.

[Structure of a Backlight Unit]

Figure 2:
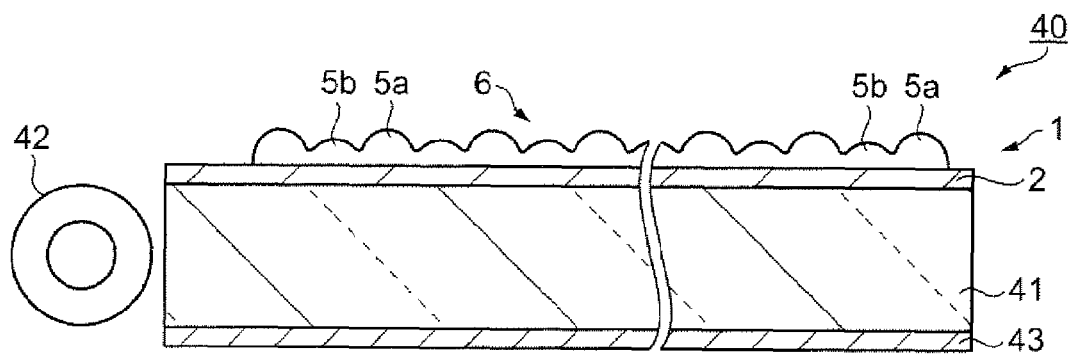
FIG. 2 is a cross-sectional view schematically showing a backlight unit.

Next, a structure of a backlight unit according to the invention is to be described. FIG. 2 is a cross-sectional view schematically showing the backlight unit.

In FIG. 2, a backlight unit 40 is configured with a light source 42, a light guide plate 41 disposed close to the light source 42, a reflector plate 43 disposed facing the light guide plate 41, and the optical sheet 1 disposed at an opposite surface to the surface of the light guide plate 41 which the reflector plate 43 is disposed. The light source 42 is an illumination device, and for example, a cold cathode fluorescent lamp and the like is used. The light irradiated from the light source 42 spreads over the entire surface of the light guide plate 41, and irradiates to the optical sheet 1. The irradiated light is diffused through micro lenses 5a and 5b of the optical sheet 1. The reflector plate 43 reflects light irradiated from the light source 42, and reflects light so that light is to be emitted from the entire surface of the light guide plate 41.

Further, reflective dots (not shown) are formed on the light guide plate 41. As the light ray from the light source 42 advance through the light guide plate 41 with a total reflection, it hits the reflective dots and changes the direction, so that a light component which becomes smaller than the total reflection angle is to irradiate from the light guide plate 41. To reflect light uniformly, an arrangement of the reflective dots are to be disposed so as to become denser as they further away from the light source 42. The optical sheet 1 also provides a function that the reflective dots viewed from the front of the light guide plate 41 are difficult to see by the diffusion.

The light guide plate 41 has an approximately flat surface and a transparency to transmit light, and for example, the transparent resin materials such as acrylic resin, glass, quartz, polycarbonate, polyester and the like is used.

[Structure of an Electro-Optical Device]

Figure 3:
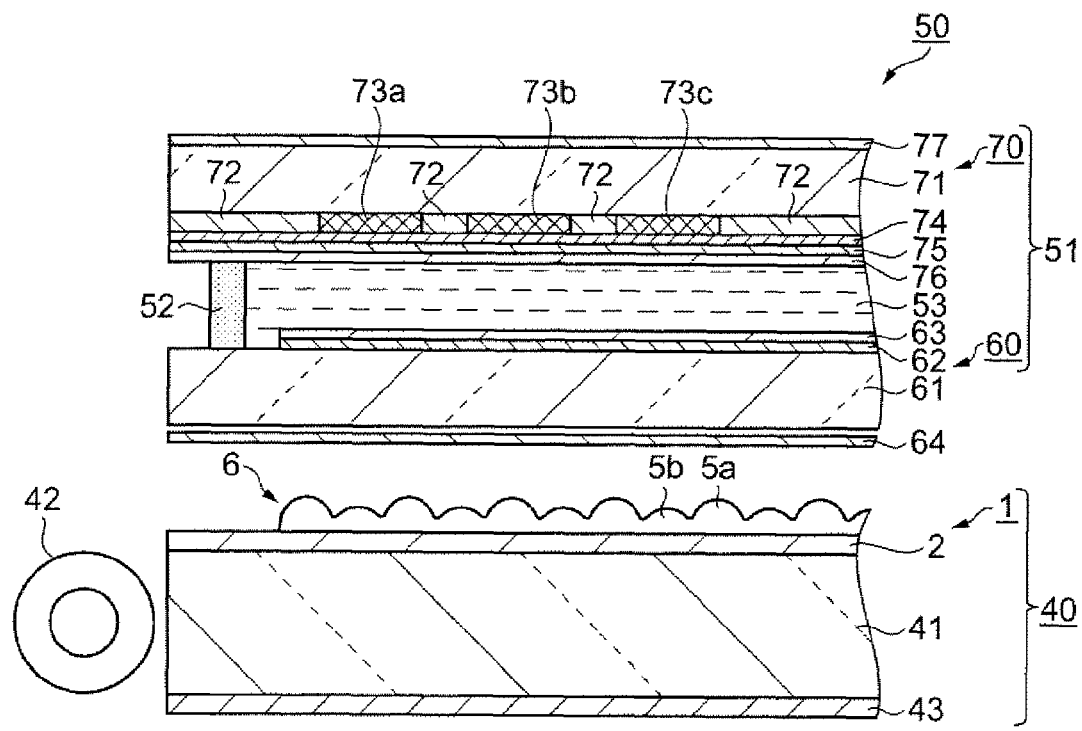
FIG. 3 is a cross-sectional view schematically showing a liquid crystal display device as an electro-optical device.

Next, a structure of an electro-optical device according to the invention is to be described. FIG. 3 is a cross sectional view schematically showing a liquid crystal display device as the electro-optical device.

In FIG. 3, a liquid crystal display device 50 is configured with the backlight unit 40 and a liquid crystal display unit 51 which displays by receiving light irradiated from the backlight unit 40.

In the liquid crystal display unit 51, a lower substrate portion 60 is placed close to the optical sheet 1 of the backlight unit 40, and has an upper substrate portion 70 which is facing the lower substrate portion 60. The lower substrate portion 60 and the upper substrate portion 70 maintain a space defined by a seal material 52, and a liquid crystal material 53 is encapsulated in the space.

The lower substrate portion 60 has a lower transparent substrate 61, a display electrode 62 formed on a top surface of the lower transparent substrate 61, and a light distribution film 63 formed on the top surface of the display electrode 62. Further, a polarizing plate 64 is disposed at the opposite surface to the display electrode 62 against the lower transparent substrate 61.

The upper substrate portion 70 has an upper transparent substrate 71, a black matrix 72 formed on the surface of the upper transparent substrate 71 against the direction to the lower transparent substrate 61, and color filters 73a (R), 73b (G) and 73c (B) as color elements formed in a region defined by the black matrix 72. Further, it has a protection film 74 which is formed on the top surfaces of the black matrix 72 and the color filters 73a, 73b and 73c, a common electrode 75 which is formed on the top surface of the protection film 74, and a distribution film 76 formed on a top surface of the common electrode 75. Furthermore, a polarizing plate 77 is disposed at the opposite surface to the color filters 73a, 73b and 73c of the upper transparent substrate 71.

The lower substrate portion 60 and the upper substrate portion 70 are adhered by an adhesive power of the seal material 52 and the liquid crystal material 53 is encapsulated between the substrate portions 60 and 70 which is defined by the height of the seal material 52.

[Structure of an Electronic Apparatus]

Figure 4:
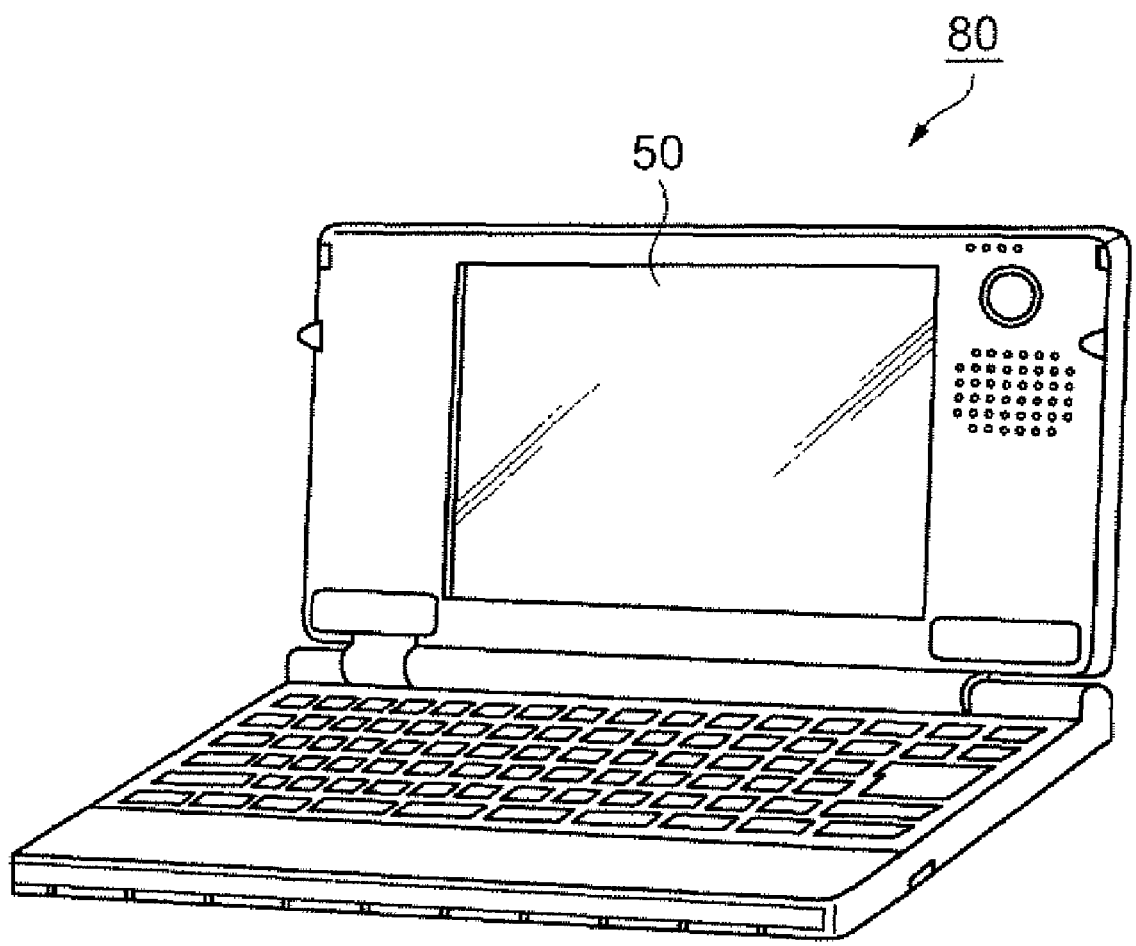
FIG. 4 is a perspective view schematically showing a personal computer as an electronic apparatus.

Next, a structure of an electronic apparatus according to the invention is to be described. FIG. 4 is a perspective view schematically showing a personal computer as the electronic apparatus. In FIG. 4, the liquid crystal display device 50 as the electro-optical device is mounted on a display unit of a personal computer 80.

[Method for Manufacturing the Optical Sheet]

Figure 5A:
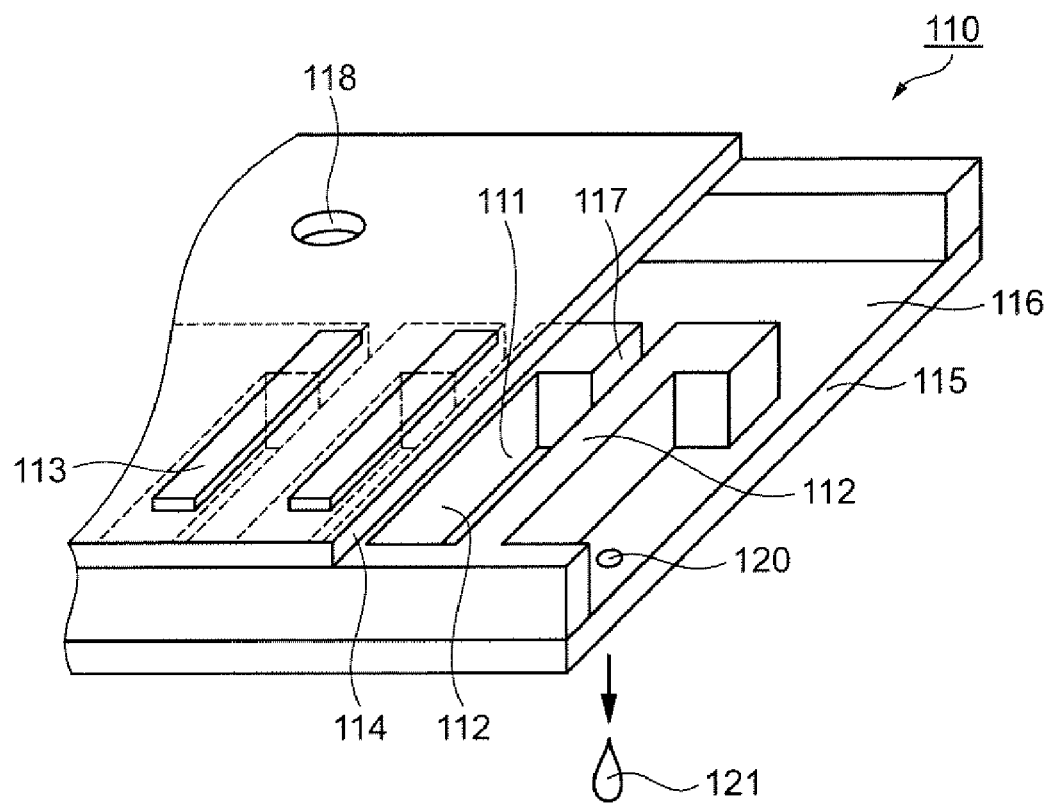
FIGS. 5A and 5B show structures of a discharge head.
Figure 5B:
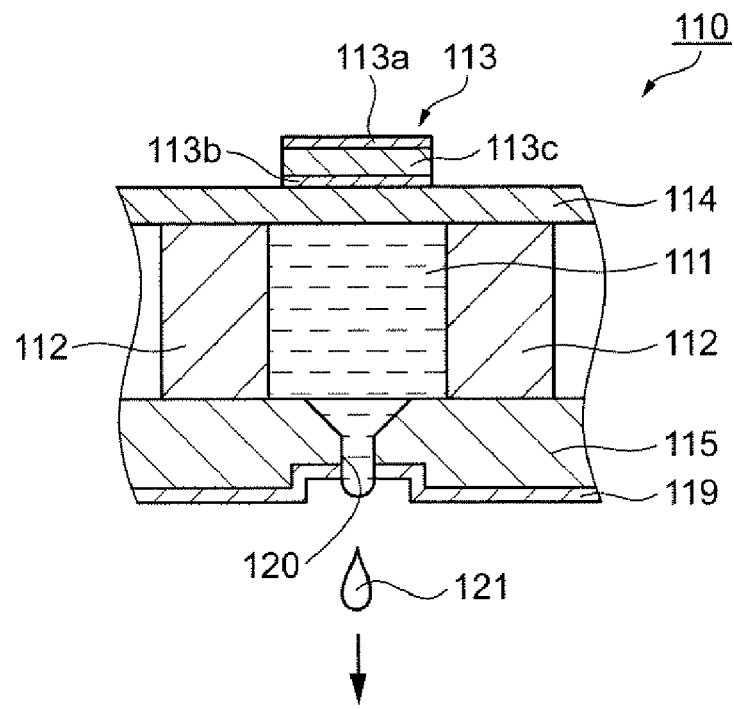

Next, a method for manufacturing the optical sheet according to the invention is to be described. FIGS. 5A and 5B show structures of a discharge head, FIG. 5A is a partially broken perspective view, and FIG. 5B is a cross sectional view of a main part.

In FIGS. 5A and 5B, a code 110 is the discharge head.

In FIG. 5A, the discharge head 110 provides a vibration plate 114 and a nozzle plate 115. A liquid reservoir 116 is disposed between the vibration plate 114 and the nozzle plate 115, so that a functional liquid, which is supplied through a hole 118, is being filled up constantly. Further, a plurality of baffles 112 are placed between the vibration plate 114 and the nozzle plate 115. And a portion surrounded by the vibration plate 114, the nozzle plate 115, and a pair of the baffles is a cavity 111. As the cavity 111 is provided corresponding to a nozzle 120, the number of the cavity 111 and the number of the nozzle 120 are equal. The functional liquid is supplied from the liquid reservoir 116 to the cavity 111 through a supply port 117 which is placed between the pair of baffles 112.

As shown in FIG. 5B, on the vibration plate 114, an oscillator 113 is mounted corresponding to the cavity 111, respectively. The oscillator 113 has a piezo element 113c and a pair of electrodes 113a and 113b which sandwich the piezo element 113c in between. By applying a driving voltage to the pair of electrodes 113a and 113b, the functional liquid which becomes liquid droplets 121 are discharged from the corresponding nozzle 120. At the periphery of the nozzle 120, in order to prevent the liquid droplets 121 from curved flight, the nozzle 120 from clogging and the like, a repelling functional liquid layer 119 which is made of, for example, a Ni-tetrafluoroethylene eutectoid plated layer is provided. Further, in order to discharge the functional liquid, an electro-thermal converting element may be used instead of the oscillator 113 which enables to discharge a material liquid by using thermal expansion of the material liquid by the electro-thermal converting element.

Next, a method for manufacturing the optical sheet is to be described. FIGS. 6A to 6E are process charts showing the method for manufacturing the optical sheet.

Figure 6A:
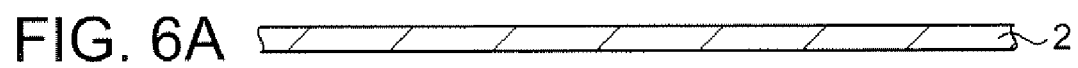
FIGS. 6A to 6E are process charts showing a method for manufacturing the optical sheet.

In the liquid-repellent treatment process of FIG. 6A, the liquid-repellent treatment is applied over the surface of the sheet 2. The liquid-repellent treatment is treated with $CF_4$ plasma and the like.

Figure 6B:
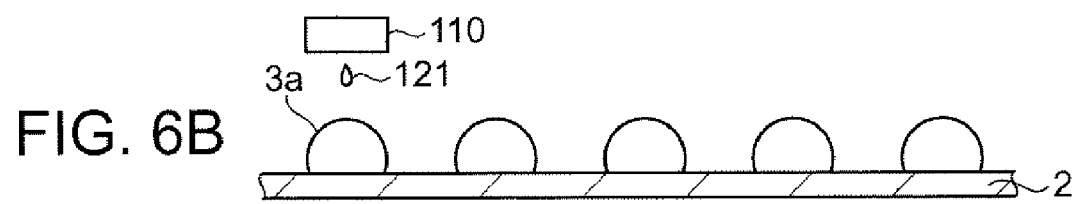

In a first discharging process of FIG. 6B, the liquid droplets 121 of a first lens material 3a in liquid form, which is to become a material for the micro lenses, are discharged toward the sheet 2 from the discharge head 110, and the first lens material 3a in liquid form is to be deposited on the sheet 2. The discharge is performed by controlling the amount of the discharge and a landing position so that the first lens material 3a in liquid form do not come in contact with the adjacent first lens material 3a during the discharge. During the liquid droplet discharge, the first lens material 3a disposed on the sheet 2 may form one shape of the lens by discharging one droplet of the liquid droplet, or may form one shape of the lens by discharging a plurality of liquid droplets.

Figure 6C:
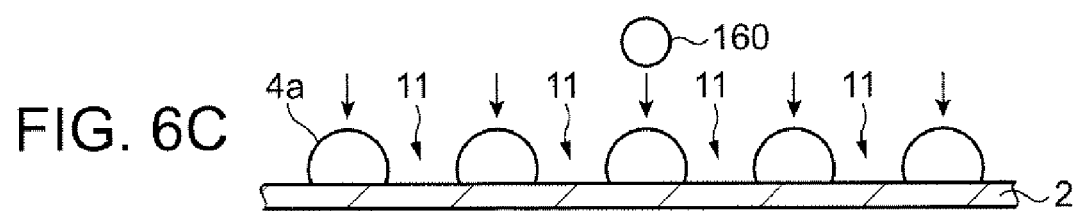

In the semi-curing process of FIG. 6C, a first lens material 4a in a semi-cured state is formed by semi-curing the first lens material 3a. The semi-curing is performed by irradiating UV light to the first lens material 3a by an ultraviolet irradiation unit 160. The first lens material 3a becomes the semi-cured state by shortening UV light irradiation time or weakening the irradiation intensity of UV light.

Figure 6D:
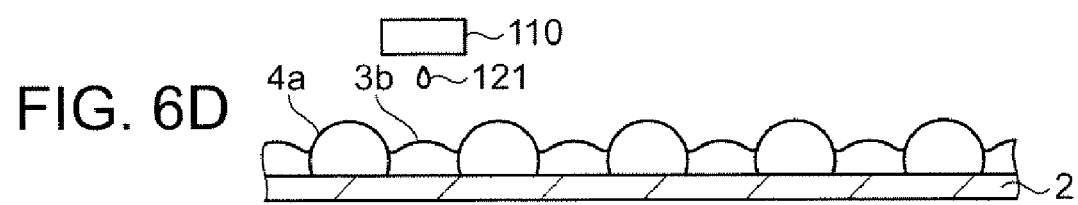

In a second discharging process of FIG. 6D, the liquid droplets 121 of a second lens material 3b in liquid form, which is the same material as the first lens material 3a, are discharged toward the gap portions 11 between the dots of the first lens material 4a, so that the second lens material 3b is to be disposed so as to cover the gap portions 11 and a part of the first lens material 4a.

Figure 6E:
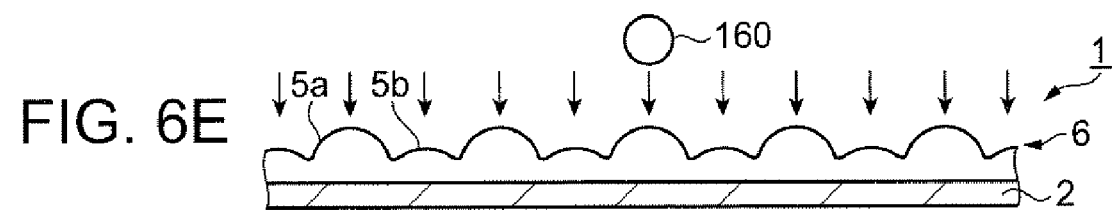

In the full curing process of FIG. 6E, a first and a second lens materials 5a and 5b are formed by curing the first and the second lens materials 4a and 3b by irradiating UV light from the ultraviolet irradiation unit 160, so that an integrated micro lens array 6 is formed.

Therefore, according to the above embodiments, following effects are to be achieved.

(1) On the optical sheet 1, the second micro lens 5b is formed on a part of the first micro lens 5a and the gap portions 11 between the dots of the first micro lens 5a, so that the top of the sheet is covered with the micro lens array 6 almost without gap, which enables to have high luminance and reduce the luminance irregularity.

(2) As the second lens material 3b is discharged while the first lens material 4a is in semi-cured state, even when the first lens material 4a and the second lens material 3b come in contact, they will not bond into one large liquid droplet like when they were in liquid form, which enables to form the micro lens array 6 in a state that the shape of the first lens material 4a is maintained.

The present invention is not limited to the above embodiments but the following modification examples are to be included.

MODIFICATION EXAMPLE 1

Figure 7:
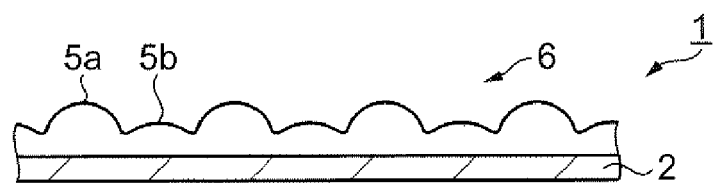
FIG. 7 is a cross-sectional view schematically showing an optical sheet of a modification example 1.

According to the present embodiment, the curvatures of the first and the second micro lenses 5a and 5b are formed approximately the same, but it is not limited to this. For example, as shown in FIG. 7, the first and the second micro lenses 5a and 5b with different curvatures may be formed. By doing so, for example, when the curvature of the second micro lens 5b is formed smaller than the first micro lens 5a, a focusing length towards the liquid crystal display unit 51 will be approximately equal even if the height of the lenses are different.

MODIFICATION EXAMPLE 2

Figure 8:
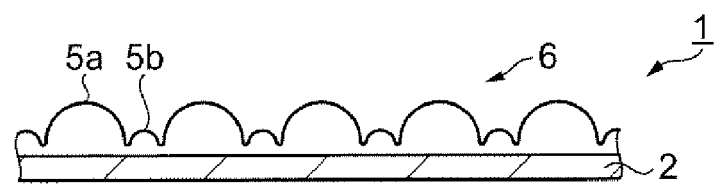
FIG. 8 is a cross-sectional view schematically showing an optical sheet of a modification example 2.

According to the present embodiment, the size of the first and the second micro lenses 5a and 5b are formed approximately the same, but it is not limited to this. For example, as shown in FIG. 8, the first and the second micro lenses 5a and 5b with different sizes may be formed. Even doing so, as the sheet 2 is covered with the micro lens array 6, diffusion can be improved.

MODIFICATION EXAMPLE 3

Figure 9:
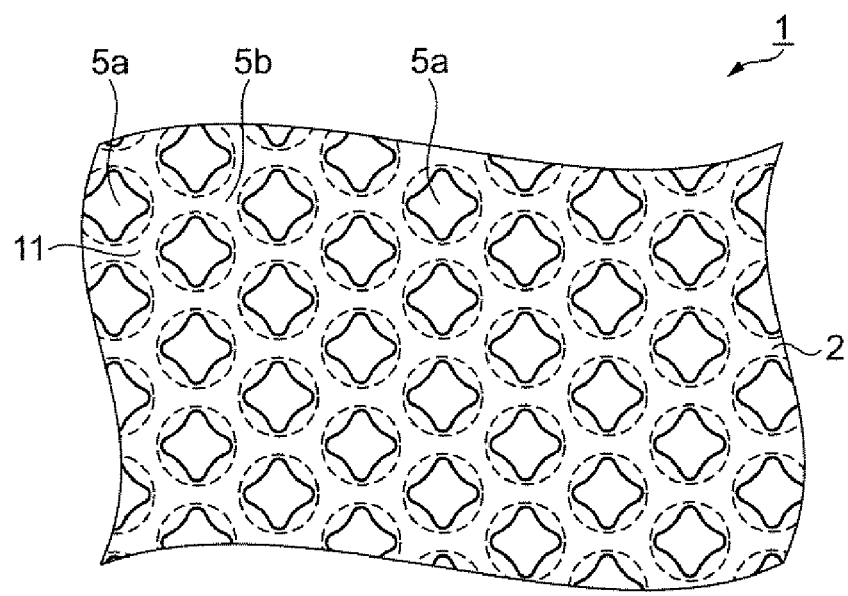
FIG. 9 is a plan view schematically showing an optical sheet of a modification example 3.

According to the present embodiment, the first micro lens 5a is disposed in a square lattice, but it is not limited to this. For example, as shown in FIG. 9, it may be formed in a staggered arrangement. By doing so, the space between the dots of the first micro lens 5a become dense, which enables to cover the sheet 2 with the first and the second micro lenses 5a and 5b easily without gap, by relatively small amount of discharge of the second lens material.

MODIFICATION EXAMPLE 4

According to the present embodiment, the lens material for the first and the second micro lenses 5a and 5b are the same, but it is not limited to this, and the first and the second micro lenses 5a and 5b may be formed with the different materials By doing so, as the refractive index becomes different, it enables to adjust the focal length towards the liquid crystal display unit 51.

MODIFICATION EXAMPLE 5

In FIGS. 6A to 6E, a lyophilic treatment may be applied on the surface of the sheet 2 and on the surface of the first lens material 4a before the second discharging process of FIG. 6D. By doing so, as the wettability increases by the lyophilic treatment, the second lens material 3b which is discharged during the second discharge process, spreads over the gap portions 11 and enables to fill the gap portions 11 with ease.

MODIFICATION EXAMPLE 6

A material which includes the diffused fine particles may be used for at least either one of the first lens material 3a or the second lens material 3b. By doing so, diffusion can further be improved.

MODIFICATION EXAMPLE 7

According to the present embodiment, the second micro lens 5b which is formed by the second discharging process has a convex shape, but it is not limited to this, and may have a concave shape. Even doing so, high luminance can be obtained and the luminance irregularity can be reduced

MODIFICATION EXAMPLE 8

The process of applying the liquid-repellent treatment to the first lens material 4a may be provided before the second lens material discharging process of FIG. 6D. By doing so, as the second lens material 3b repels against the first lens material 4a, it is easy to form the second micro lens 5b in the convex shape.

MODIFICATION EXAMPLE 9

The materials of the first lens material 5a and the second lens material 3b may be different, and the second lens material 3b may have liquid-repellency against the first lens material 3a. By doing so, as the second lens material 3b repels against the first lens material 4a, which the first lens material 3a is being semi-cured, it is easy to form the second micro lens 5b in the convex shape.

What is claimed is:

1. A method for manufacturing an optical sheet, comprising:
    (a) discharging a first lens material in liquid form being a material for a micro lens on a sheet in a dot array;
    (b) semi-curing the first lens material arranged on the sheet;
    (c) discharging a second lens material in liquid form being the material for the micro lens towards a gap portion between the dots of the first lens material; and
    (d) forming a micro lens array by full curing the first and the second lens materials.

2. The method for manufacturing the optical sheet according to claim 1, further comprising:
    applying a liquid-repellent treatment on the sheet before the first discharging process.

3. The method for manufacturing the optical sheet according to claim 1, wherein
    he step (a), the dot array is formed by discharging the first lens material in a staggered arrangement; and in the step (c), the second lens material is discharged into the gap portions between the dots of the first lens material.

4. The method for manufacturing the optical sheet according to claim 1, further comprising:

including a diffusion fine particle in at least one of either the first lens material or the second lens material.

5. An optical sheet manufactured by the method for manufacturing an optical sheet according to claim 1.

6. The method of claim 1, wherein the first and second lens materials, when cured, have different heights.

* * * * *